Figure 1:
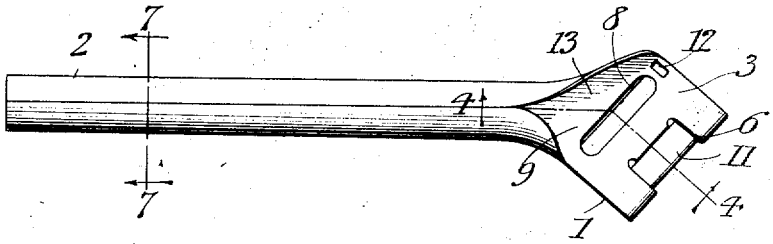

S. KORPER.

SAFETY CORN PARER.

APPLICATION FILED OCT. 9, 1912.

Reissued Mar. 11. 1913.

13,544.

WITNESSES

Titus B. Sears

John Pughese

INVENTOR

Simon Korper

BY

C. W. Fairbank

ATTORNEY

UNITED STATES PATENT OFFICE.

SIMON KORPER, OF NEW YORK, N. Y., ASSIGNOR TO HENRY H. ZELLNER, OF NEW YORK, N. Y.

SAFETY CORN-PARER.

13,544. Specification of Reissued Letters Patent. Reissued Mar. 11, 1913.

Original No. 1,014,154, dated January 9, 1912, Serial No. 617,926. Application for reissue filed October 9, 1912. Serial No. 724,869.

*To all whom it may concern:*

Be it known that I, SIMON KORPER, a citizen of the United States, and a resident of the city of New York, borough of Manhattan, in the county and State of New York, have invented certain new and useful Improvements in Safety Corn-Parers; and I do declare the following to be a full, clear, and exact description of the invention, such as will enable others skilled in the art to which it appertains to use the same.

My invention is shown as embodied in a device particularly adapted for use in removing very thin sheets or layers from corns or callous parts and without liability of cutting too deeply.

My invention relates particularly to the means for supporting the blade in the desired relationship to the handle and limiting the depth of the cut.

One of the main features of my invention consists in the mounting of the blade in a plane at a slight angle to the surface passed over and with the edge at an acute angle to the direction of movement, so that it will be caused to effect a draw cut. Preferably, the blade is mounted upon the under surface of the blade support and the blade support has a slot adjacent to the cutting edge and extending parallel thereto, one edge of the slot being properly spaced from the cutting edge so as to control the depth of the cut. The blade, which in itself forms no part of my invention but which I prefer to employ, is formed of a thin sheet of metal with a reinforcing or backing strip along the rear edge.

This backing strip is preferably held in the fold of a blade casing, and one feature of my invention consists in the cutting away of a portion of the fold and the slight inward bending of the metal at one edge of the opening thus formed, so that the blade may be readily grasped by its backing strip when it is desired to remove the blade, and whereby the inwardly bent portion will coöperate with the backing strip and serve as a guide to permit lengthwise movement of the blade but positively prevent a forward movement of the blade. Thus, the blade cannot be carelessly inserted in such a manner as to permit of too deep a cut.

The blade casing is, as previously indicated, formed of two portions of the metal bent to approximately parallel positions, so as to form a blade support and a blade retainer with the backing strip of the blade in the fold. The blade support is preferably formed integral with the handle and is connected thereto by an intermediate portion substantially triangle-shaped and having its edges curled upwardly as they approach the handle so as to assume tubular form where the intermediate portion merges into the handle. The blade support is carried by this intermediate portion along the side of the latter opposite to the handle, and the other two sides of the intermediate portion are of different lengths so that the cutting edge of the blade will come in a line at the desired angle, for instance, at forty-five degrees to the longitudinal extension of the axis of the handle. The intermediate portion is preferably bent to lie at a slight angle to the handle and the blade-supporting plate is bent in the opposite direction to lie at a slight angle to the intermediate portion, so that a receptacle is formed by the upwardly- and oppositely-inclined intermediate portion and blade support, and by the upwardly-curving edge of said intermediate portion. The shavings or other material removed by the blade enter this receptacle through the slot, which is disposed adjacent to the lowermost portion of the receptacle.

Having thus described the principal features of my invention in a general way, I will now describe a simple, strong, durable and efficient embodiment thereof in connection with the accompanying drawings in which—

Figure 2:
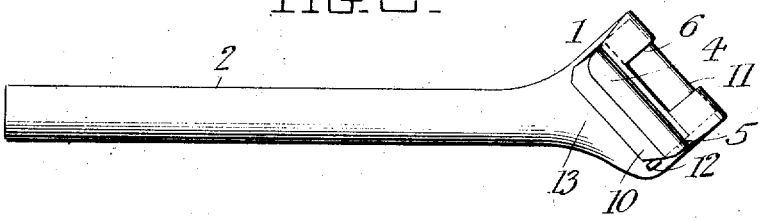
Figure 3:
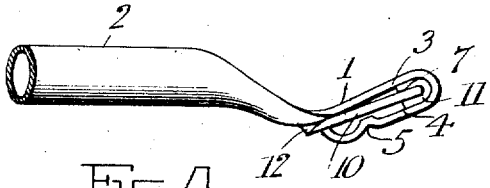
Figure 5:
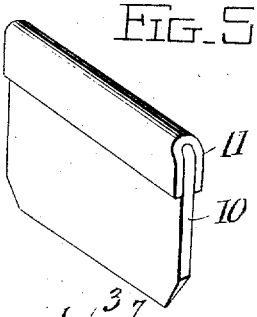
Figure 4:
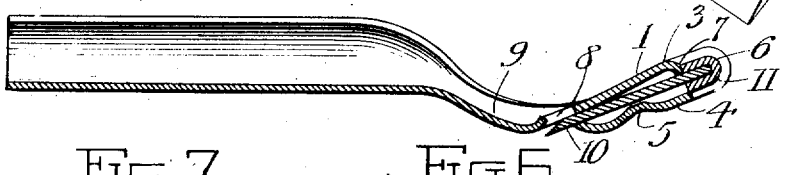
Figure 7:
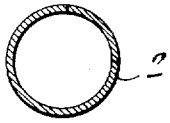
Figure 6:
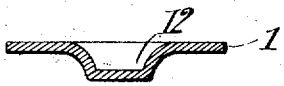

Figure 1 is a top plan view of a corn parer constructed in accordance with my invention; Fig. 2 is a bottom plan view; Fig. 3 is a side view looking in a direction parallel to the edge of the blade; Fig. 4 is a central longitudinal section on the line 4—4 of Fig. 1; Fig. 5 is a detail view of the blade; Fig. 6 is an enlarged view of the stop for preventing the blade passing out the opposite side of the holder while being inserted; and Fig. 7 is a detail cross sectional view through the handle on the line 7—7 of Fig. 1.

The preferred embodiment of my improved corn-parer which is illustrated, comprises a combined blade casing and guard 1 and a handle 2 formed from a single piece of metal. The blade casing 1 is bent to lie in a plane at an angle to the handle, as shown in Figs. 3 and 4 of the drawings and so as to hold the blade with its cutting edge at an acute angle to the axis of the handle, as shown in Figs. 1 and 2. The blade is thus caused to effect a draw cut over the surface being treated. Said casing comprises an upper substantially flat plate 3 having its outer end bent back or doubled upon itself to form a spring blade holder 4. The spring blade holder 4 is preferably curved transversely forming an inwardly projecting rib 5. In the plate 3 at the bend or where it is folded is an opening 6 in the form of a notch in the outer end of the blade casing of the device, whereby the blade may be grasped by the fingers and readily adjusted. The inner wall of the opening 6 is bent slightly inward at 7 to bear upon the blade when the latter is inserted in the casing and acts as a shoulder against the edge of a backing strip 11, hereinafter described, to prevent accidental forward movement of the blade. In the plate 3, near the inner end thereof, is a slot 8 adjacent to and beneath the edge of the blade to permit the shavings or parings to pass through the plate 3 and upon the depressed or curved outer side of the same. Said plate when in use inclines upwardly in one direction and the adjacent substantially triangular part of the handle inclines upwardly in the opposite direction with upwardly-curving side edges, thus forming a receptacle 9 for the parings, as clearly shown in Figs. 1 and 4 of the drawings.

The handle 2 of the device is formed by bringing the edges of the metal together thus forming a cylindrical tube which may be of any desired length. The portion 13 between the handle proper and the blade casing is substantially triangular with the handle at one apex and the blade casing at the opposite side. The other two sides are of unequal lengths and this difference in length controls the extent of the draw cut. Adapted to be engaged by the blade holder 4 is a blade 10, which may be of any suitable construction and is preferably in the form of a thin steel plate having one edge sharpened and on its opposite edge the backing strip 11. The blade and backing strip reach from the folded edge of the plate 3 to a position above the slot 8, in which position the blade is held by the front edge of the spring holder 4, the rib 5 and the shoulder 7, as clearly shown in Fig. 4 of the drawings. To place the blade in the casing, the blade is inserted between the plate 3 and the spring holder 4 from one end of the casing, and in order to prevent the blade projecting out through the opposite end, a suitable stop 12 is formed preferably by indenting the metal of the plate 3, thus producing a teat on the opposite side of the plate with which the end of the blade will engage when inserted in place. The blade may be adjusted to final position with its cutting edge in proper position with respect to the slot 8, by grasping the backing strip of the blade at the portion exposed through the notch or opening 6 in the outer edge of the casing.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention claimed.

Having thus described my invention, I claim as new and desire to secure by Letters Patent:

1. A corn-cutter including a blade supporting plate, a tubular handle portion and an intermediate connecting portion all formed of a single piece of sheet metal, said intermediate portion having its side edges gradually opened out from said tubular handle portion to said blade supporting plate to leave upwardly projecting side walls and said blade supporting plate extending upwardly at an angle from said intermediate portion, and having a slot therethrough extending along the angle of intersection of said blade supporting plate and said intermediate portion and a separable blade having its cutting edge in operative position in respect to said slot and facing toward said handle.

2. A corn-cutter including a blade supporting plate, a tubular handle portion and an intermediate connecting portion all formed of a single piece of sheet metal, said intermediate portion having its side edges opened out from said tubular handle portion to said blade supporting plate and one of said side edges being of greater length than the other, and said blade supporting plate extending upwardly at a slight angle from said intermediate portion, and having a slot therethrough extending along the angle of intersection of said blade supporting plate and said intermediate portion and oblique to the longitudinal extension of the axis of the handle, and a separable blade lying in a plane at an angle to the axis of the handle and having its cutting edge in operative position in respect to said slot and also oblique to the longitudinal extension of the axis of the handle.

3. A device of the class described, including a blade-carrying member and a blade, said blade-carrying member being formed of sheet metal and including a tubular handle, the sheet of metal at one end of said handle being bent slightly at an angle to said handle and having its edges gradually opened out to form a plate disposed in a plane intersected by the axis of said handle, and means for supporting said blade upon the surface of said plate away from said handle and with its cutting edge at an acute angle to the extension of the axis of said handle, and said plate having an opening adjacent to said cutting edge whereby the material cut away by said blade may pass through to the upper surface of said blade-supporting member and be retained by the side edges of the portion intermediate of said plat. and the handle proper, and by the oppositely and upwardly-inclined intermediate portion and plate.

4. A device of the class described, including a blade supporting plate having one edge folded over to form a blade retainer, a blade having a reinforcing strip along the rear edge slidably retained within said fold, said plate and said retainer at said fold being cut away to expose the opposite surfaces of said reinforcing strip across the width of the latter and to permit said strip to be gripped between the thumb and finger to slide the blade endwise, the metal at one edge of the opening being bent inwardly and serving to engage with the edge of the reinforcing strip to prevent forward movement of the cutting edge of said blade.

In testimony whereof I have signed my name to this specification in the presence of two subscribing witnesses.

SIMON KORPER.

Witnesses:
ETHEL B. CLAYTON,
EMMA KORPER.